United States Patent
Song et al.

(10) Patent No.: US 9,029,014 B2
(45) Date of Patent: May 12, 2015

(54) ANODE AND LITHIUM BATTERY INCLUDING ANODE

(75) Inventors: Min-sang Song, Seongnam-si (KR); Kyu-sung Park, Suwon-si (KR); Gue-sung Kim, Yongin-si (KR); Soo-an Song, Seoul (KR); Jae-hyung Kim, Cheonan-si (KR); Ji-yong Eom, Daejeon (KR); Seung-goo Baek, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 271 days.

(21) Appl. No.: 13/067,982

(22) Filed: Jul. 13, 2011

(65) Prior Publication Data

US 2012/0104326 A1 May 3, 2012

(30) Foreign Application Priority Data

Nov. 2, 2010 (KR) .................. 10-2010-0108406

(51) Int. Cl.
| | |
|---|---|
| *H01M 4/13* | (2010.01) |
| *H01M 4/131* | (2010.01) |
| *C01G 23/00* | (2006.01) |
| *H01M 4/485* | (2010.01) |
| *H01M 4/505* | (2010.01) |
| *H01M 4/525* | (2010.01) |
| *H01M 4/54* | (2006.01) |
| *H01M 4/62* | (2006.01) |
| *H01M 10/0525* | (2010.01) |
| *H01M 4/02* | (2006.01) |

(52) U.S. Cl.
CPC ............ *H01M 4/131* (2013.01); *C01G 23/002* (2013.01); *C01G 23/005* (2013.01); *C01P 2002/50* (2013.01); *C01P 2002/72* (2013.01); *C01P 2002/84* (2013.01); *C01P 2006/40* (2013.01); *H01M 4/485* (2013.01); *H01M 4/505* (2013.01); *H01M 4/525* (2013.01); *H01M 4/54* (2013.01); *H01M 4/623* (2013.01); *H01M 4/625* (2013.01); *H01M 4/626* (2013.01); *H01M 10/0525* (2013.01); *H01M 2004/021* (2013.01); *H01M 2004/027* (2013.01); *Y02E 60/122* (2013.01)

(58) Field of Classification Search
USPC ............ 252/182.1; 429/231.1, 231.95, 218.1, 429/231.5
See application file for complete search history.

(56) References Cited

U.S. PATENT DOCUMENTS

| | | | |
|---|---|---|---|
| 5,545,468 A * | 8/1996 | Koshiba et al. ............ | 429/231.1 |
| 7,267,908 B2 * | 9/2007 | Li et al. .................... | 429/231.95 |
| 7,547,490 B2 | 6/2009 | Spitler et al. | |
| 8,137,843 B2 | 3/2012 | Harada et al. | |
| 2002/0168574 A1 | 11/2002 | Ahn et al. | |
| 2006/0286456 A1 | 12/2006 | Fu et al. | |
| 2008/0078594 A1* | 4/2008 | Harada et al. ................ | 180/65.2 |
| 2009/0155692 A1 | 6/2009 | Park et al. | |
| 2010/0028780 A1 | 2/2010 | Hirai et al. | |
| 2010/0171466 A1* | 7/2010 | Spitler et al. .................. | 320/134 |

FOREIGN PATENT DOCUMENTS

| | | | |
|---|---|---|---|
| JP | 2007323958 A | * | 12/2007 |
| JP | 2009-176752 | | 8/2009 |
| KR | 10-0380858 | | 4/2003 |
| KR | 10-2004-0053104 A | | 6/2004 |
| KR | 10-2008-0029878 | | 4/2008 |
| KR | 10-2010-0084073 A | | 7/2010 |
| WO | WO 02/46101 A2 | | 6/2002 |

OTHER PUBLICATIONS

Machine translation of JP 2007323958, 2007.*
Erin M. Sorensen, et al., Three-dimensionally Ordered Macroporous Li4Ti5O12, etc. American Chemical Society,, Chem. Mater, 2006, 18, 482-489.

* cited by examiner

*Primary Examiner* — Mark Kopec
*Assistant Examiner* — Haidung Nguyen
(74) *Attorney, Agent, or Firm* — Lee & Morse, P.C.

(57) ABSTRACT

An anode includes an anode active material including a lithium titanium oxide, a binder, and 0 to about 2 parts by weight of a carbon-based conductive agent based on 100 parts by weight of the lithium titanium oxide.

7 Claims, 9 Drawing Sheets

ANODE AND LITHIUM BATTERY INCLUDING ANODE

CROSS-REFERENCE TO RELATED APPLICATIONS

This application claims the benefit of Korean Patent Application No. 10-2010-0108406, filed on Nov. 2, 2010, in the Korean Intellectual Property Office, the disclosure of which is incorporated herein in its entirety by reference.

BACKGROUND

A secondary battery may include a cathode, an anode, an electrolyte, and a separator. Graphite may be considered the most commonly available as an anode active material. Research is being conducted regarding different materials that may be used as the anode active material.

SUMMARY

Embodiments may be realized by providing an anode that includes an anode active material including a lithium titanium oxide, a binder, and 0 to about 2 parts by weight of a carbon-based conductive agent based on 100 parts by weight of the lithium titanium oxide.

The lithium titanium oxide may be represented by Formula 1 below:

$$Li_{4+x}Ti_{5-y}M_zO_{12-n},$$  <Formula 1> where $-0.2 \leq x \leq 0.2$, $-0.3 \leq y \leq 0.3$, $0 \leq z \leq 0.3$, $-0.3 \leq n \leq 0.3$, and M includes at least one selected from the group consisting of lithium (Li), magnesium (Mg), aluminium (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

An amount of the carbon-based conductive agent may be 0 parts by weight based on 100 parts by weight of the lithium titanium oxide.

The carbon-based conductive agent may include at least one selected from the group consisting of carbon black, a carbon fiber, and graphite.

The anode may further include other conductive agents, and the other conductive agents may include at least one selected from the group consisting of metallic fibers, non-metallic powders, metallic powders, conductive whiskers, conductive metal oxides, and polyphenylene derivatives.

A ratio [(I(D)+I(G))/I(F2g)] is 0 to about 0.44, where I(D) is a peak intensity of a D band on a Raman spectra of the anode at a Raman shift of 1300 to 1400 cm$^{-1}$, I(G) is a peak intensity of a G band on the Raman spectra of the anode at a Raman shift 1500 to 1700 cm$^{-1}$, and I(F2g) is a peak intensity of a F2g oscillation mode having a spinel structure on the Raman spectra at a Raman shift of 200 to 300 cm$^{-1}$.

Embodiments may also be realized by providing a lithium battery that includes any one of the anodes discussed above. The lithium battery may be a secondary battery.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
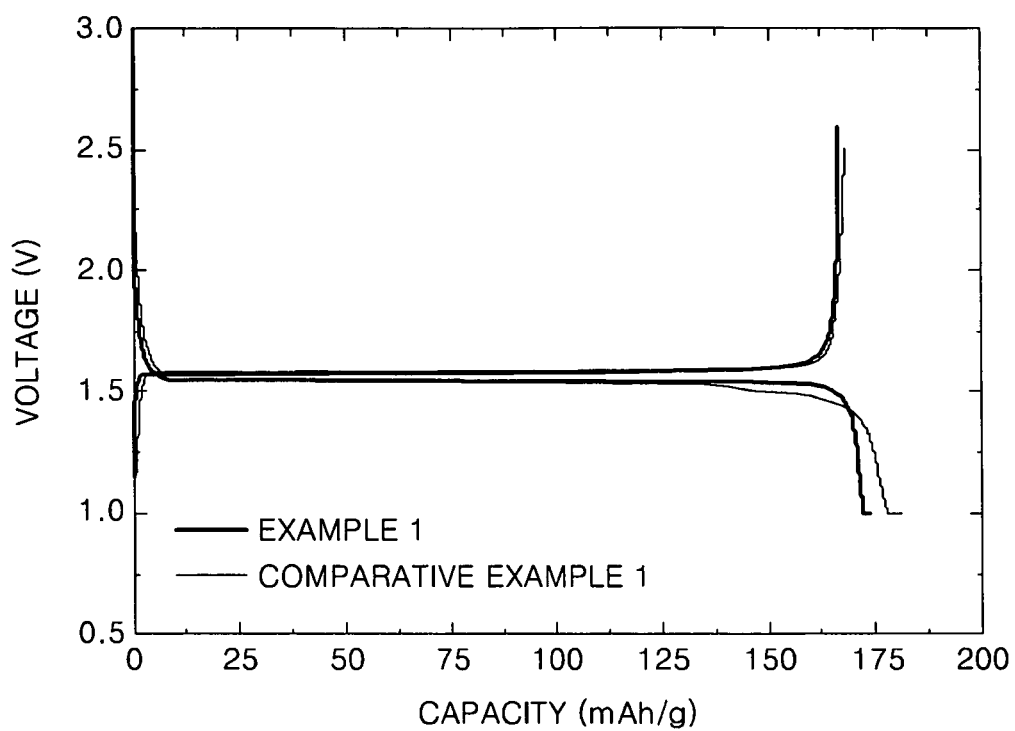
FIG. 1 illustrates a graph of charge-discharge efficiencies of coin-type half cells prepared in Example 1 and Comparative Example 1, respectively.

Korean Patent Application No. 10-2010-0108406, filed on Nov. 2, 2010, in the Korean Intellectual Property Office, and entitled: "Anode and Lithium Battery Including Anode," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, an anode and a lithium battery including the anode will be described with regard to exemplary embodiments with reference to the attached drawings.

An anode, according to an exemplary embodiment, may include an anode active material including a lithium titanium oxide, a binder, and 0 to about 2 parts by weight of a carbon-based conductive agent based on 100 parts by weight of the lithium titanium oxide. Throughout this specification, the terminology "carbon-based conductive agent" refers to a conductive material that substantially only includes carbon, and excludes hydrocarbon, derivatives thereof, and the like. The lithium titanium oxide may be represented by Formula 1 below:

$$Li_{4+x}Ti_{5-y}M_zO_{12-n},$$  <Formula 1> where $-0.2 \leq x \leq 0.2$, $-0.3 \leq y \leq 0.3$, $0 \leq z \leq 0.3$, $-0.3 \leq n \leq 0.3$, and M may be at least one selected from the group consisting of lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

The binder may include a copolymer, e.g., an organic copolymer. The binder may include at least one material selected from the group consisting of a vinylidene fluoride/hexafluoropropylene copolymer, polyvinylidene fluoride (PVDF), polyacrylonitrile, polymethylmethacrylate, polytetrafluoroethylene, and a styrene butadiene rubber (SBR) based polymer.

The carbon-based conductive agent may generate gas when a lithium battery including the anode is charged and discharged at a high temperature, and thus the properties of the lithium battery may deteriorate. In consideration of this fact, the anode according to exemplary embodiments may not include any carbon-based conductive agent, or may include about 2 or less parts by weight of the carbon-based conductive agent based on 100 parts by weight of the lithium titanium oxide. For example, the carbon-based conductive agent may be included in about 1 or less parts and/or 0.5 or less parts by weight of the lithium titanium oxide.

The carbon-based conductive agent may include at least one selected from the group consisting of carbon black, a carbon fiber, and graphite. For example, the carbon black may be at least one selected from the group consisting of an acetylene black type carbon black, an electroconductive carbon black sold under the trademark Ketjenblack®, a conductive carbon black sold under the trademark SUPER P®, a channel black type carbon black, a furnace black type carbon black, a lamp black type carbon black, and a thermal black type carbon black. The graphite may be natural or artificial graphite.

The anode may further include other conductive agents other than the carbon-based conductive agent.

The other conductive agents may be at least one selected from the group consisting of conductive fibers such as metallic fibers; non-metallic powder such as a carbon fluoride powder; metallic powders such as an aluminium powder, and a nickel powder; conductive whiskers such as zinc oxide and potassium titanate; conductive metal oxides such as titanium oxide; and polyphenylene derivatives.

The amount the carbon-based conductive agent may be within a range of 0 to about 2 parts by weight of a based on 100 parts by weight of the lithium titanium oxide. However, embodiments are not limited thereto. For example, the amount of the carbon-based conductive agent may be, e.g., 0 to about 1.5 parts by weight, 0 to about 1.13 parts by weight, and/or 0 to about 1.12 parts by weight, based on 100 parts by weight of the lithium titanium oxide.

On Raman spectra of the anode, a ratio $[(I(D)+I(G))/I(F2g)]$ of the sum of a peak intensity "I(D)" of a D band at a Raman shift of 1300 to 1400 $cm^{-1}$ and a peak intensity "I(G)" of a G band at a Raman shift 1500 to 1700 $cm^{-1}$, which is divided by a peak intensity "I(F2g)" of a F2g oscillation mode having a spinel structure at a Raman shift of 200 to 300 $cm^{-1}$, may be 0 to about 0.44. However, embodiments are not limited thereto. For example, the ratio $[(I(D)+I(G))/I(F2g)]$ may be, e.g., about 0.01 to about 0.3, about 0.1 to about 0.2, and/or about 0.25 to about 0.35.

With regard to the anode, without intending to be bound by this theory, if the amount of the carbon-based conductive agent, based on 100 parts by weight of the lithium titanium oxide, and the ratio $[(I(D)+I(G))/I(F2g)]$ of the sum of the peak intensity "I(D)" of the D band and the peak intensity "I(G)" of the G band to the peak intensity "I(F2g)" of the F2g oscillation mode are within the above-described ranges, when the anode is stored at a high temperature, e.g., 45 to 90° C., or a lithium battery including the anode is charged and discharged at the high temperature, an amount of the gas generated may be reduced. Thus, the cell expansion effect, e.g., expansion of the battery cell due to gas generated therein, of the lithium battery including the anode may be reduced and/or prevented. Accordingly, when the lithium battery is charged and discharged at a high temperature, a high rate discharge property, a long lifetime property, and/or a cell capacity retention may be improved and/or ensured.

The high rate discharge property is a ratio of a capacity that is actually discharged when a cell charged to 100% is discharged with a predetermined current. The predetermined current may be for substantially completely discharging a cell capacity within a predetermined period of time that is less than 10 hours to a capacity that is actually discharged when the cell charged to 100% is discharged with a current for substantially completely discharging a cell capacity in exactly 10 hours. The long lifetime property is based on a measured change in a normalized capacity according to a number of charge-discharge cycles. The cell capacity retention is a ratio of a cell capacity after the cell is stored at a high temperature to a cell capacity before the cell is stored at a high temperature.

The anode may be manufactured as follows.

First, an anode forming composition may be prepared by mixing the lithium titanium oxide, the binder, a solvent, the carbon-based conductive agent, and other conductive agents. The carbon-based conductive agent and other conductive agents may be selectively mixed, e.g., the carbon-based conductive agent and/or the other conductive agent may be selectively included or excluded in the composition.

The solvent may include, e.g., at least one of N-methylpyrrolidone (NMP), acetone, water, and the like.

Then, the anode may be prepared by coating the anode forming composition on, e.g., directly on, a current collector formed of Al or the like, and drying the resulting product on the current collector.

A lithium battery according to an exemplary embodiment may include the anode, a cathode, an electrolyte, and a separator. The separator may be selectively used, e.g., the separator may be included or excluded in the lithium battery.

The lithium battery may be prepared as follows.

The anode may be prepared using the above-described method.

A cathode may be prepared using a method similar to the above-described method of preparing the anode. For example, a cathode forming composition may be prepared by mixing a lithium transition metal oxide, a binder, a conductive agent, and a solvent. Then, the cathode may be prepared by coating the cathode forming composition on, e.g., directly on, a current collector formed of Al or the like, and drying the resulting product on the current collector.

The binder and the solvent of the cathode forming composition may be similar to and/or substantially the same as those of the anode forming composition.

The conductive agent of the cathode forming composition may include the carbon-based conductive agent, and the other conductive agents. The other conductive agents may be selectively included. For example, various combinations of conductive agents may be included or the conductive agents may be excluded in the cathode forming composition.

A separator may be disposed between the anode and the cathode. The separator may be selectively prepared. The separator may be prepared by coating a separator forming composition including, e.g., a binder, a filler, and a solvent, directly on the anode or the cathode, and drying the resulting product. The separator may be a polyethylene (PE) film or a polypropylene (PP) film. The separator may be prepared in a form of a woven fabric or a non-woven fabric.

The filter may be, e.g., a glass fiber.

The binder and the solvent of the separator forming composition may be similar to and/or substantially the same as those of the anode forming composition.

Forming the lithium battery may further include preparing an electrolyte. The electrolyte may be, e.g., an organic liquid electrolyte or a solid electrolyte.

The organic liquid electrolyte may be formed by, e.g., dissolving a lithium salt in an organic solvent.

The organic solvent may be selected from the group consisting of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl cabonate, dipropyl carbonate, dibutyl carbonate, benzo nitrile, aceto nitrile, tetrahydrofuran, 2-methyl tetrahydrofuran, γ-butyrolactone, dioxolane, 4-methyl-1,3-dioxolane, N,N-dimethylformamide, dimethylacetamide, dimethylsulfoxide, dioxane, 1,2-dimethoxy ethane, sulfolane, dichloroethane, chlorobenzene, nitrobenzene, diethylene glycol, dimethylether, and combinations thereof.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each a natural number), LiCl, LiI, and combinations thereof.

The solid electrolyte may be, e.g., a boron oxide, a lithium oxynitride, or the like. The solid electrolyte may be formed on the anode by using, e.g., a sputtering method.

The lithium battery may be prepared by, e.g., sequentially stacking the anode, the separator, and the cathode, winding or folding the layered product, putting the wound or folded layered product in a battery case, and then injecting an electrolyte into the battery case. The battery case may, e.g., have a cylindrical or square shape. The electrolyte may be, e.g., an organic electrolyte.

The lithium battery may be a primary battery or a secondary battery. The lithium battery may have various applications that include, e.g., a notebook computer, a smart phone, an electric vehicle, a power storage system of an electric power station, or the like.

Hereinafter, one or more exemplary embodiments will be described in detail with reference to the following examples. However, these examples are not intended to limit the purpose and scope of the one or more exemplary embodiments.

Example 1

(1) Preparation of Coin-Type Half Cell

A lithium titanium oxide ($Li_4Ti_5O_{12}$) powder and polyvinylidene fluoride (PVDF) were dissolved in N-methylpyrrolidone (NMP) in a weight ratio of 98:2, and were stirred using a mechanical method to prepare a slurry. The slurry was coated on an Al foil to a thickness of 90 μm, and was vacuum dried at a temperature of 120° C. to prepare an anode. Then, the anode was wound into a circular shape having a diameter of 12 mm to prepare a 2032 type coin-type half cell using a lithium metal as an opposite electrode. In this case, 1.1M $LiPF_6$ and 0.2M $LiBF_4$ solution in which ethylene carbonate and methylethyl carbonate are mixed in a volume ratio of 3:7 was used as an electrolyte.

(2) Preparation of 10 Ah (Amphere·Hour) Pouch-Type Full Cell

A lithium titanium oxide ($Li_4Ti_5O_{12}$) powder and polyvinylidene fluoride (PVDF) were dissolved in N-methylpyrrolidone (NMP) in a weight ratio of 95:5, and were stirred using a mechanical method to prepare a slurry. The slurry was coated on an Al foil to a thickness of 150 μm. The slurry was heat dried at 120° C. and then vacuum dried to prepare an anode. Then, a 10 Ah pouch-type full cell was prepared using the anode together with a cathode including lithium titanium oxide ($Li_4Ti_5O_{12}$). In this case, 1.1M $LiPF_6$ and 0.2M $LiBF_4$ solution in which ethylene carbonate and methylethyl carbonate are mixed in a volume ratio of 3:7 was used as an electrolyte.

Example 2

An anode was prepared in the same manner as in Example 1 except that a lithium titanium oxide ($Li_4Ti_5O_{12}$) powder, carbon black sold under the trademark SUPER P®, and polyvinylidene fluoride (PVDF) were used in a weight ratio of 89:1:10.

Example 3

An anode was prepared in the same manner as in Example 1 except that a lithium titanium oxide ($Li_4Ti_5O_{12}$) powder, carbon black sold under the trademark SUPER P®, and polyvinylidene fluoride (PVDF) were used in a weight ratio of 94:1:5.

Comparative Example 1

A coin-type half cell and a pouch-type full cell were prepared in the same manner as in Example 1 except that a lithium titanium oxide ($Li_4Ti_5O_{12}$) powder, carbon black sold under the trademark SUPER P®, and polyvinylidene fluoride (PVDF) were used in a weight ratio of 90:5:5 when an anode was prepared.

Comparative Example 2

A coin-type half cell was prepared in the same manner as in Example 1 except that a lithium titanium oxide ($Li_4Ti_5O_{12}$) powder, carbon black sold under the trademark SUPER P®, and polyvinylidene fluoride (PVDF) were used in a weight ratio of 90:4:6 when an anode was prepared.

Evaluations of the Examples

The charge-discharge properties of the coin-type half cells that were prepared in Example 1, and Comparative Examples 1 and 2, and the charge-discharge properties of the pouch-type full cells that were prepared in Example 1 and Comparative Example 1 were evaluated by using a charger/discharger (using a charge/discharger having a model no: TOYO-5200, and is available from TOYO).

Evaluation 1: Evaluation of Charge-Discharge Properties of the Coin-Type Half Cells The coin-type half cells prepared in Example 1 and Comparative Example 1 were each charged at a rate (C-rate) of 0.1 C (unit: mA/g, such that C-rate is a discharge capacity divided by time) in a first cycle until the voltage of the cell reached 1.0V. Then, the coin-type half cells were each further charged with a constant voltage of 1.0V until the electric current of the cell reached 0.01 C. Then, 10 minutes of rest was maintained, i.e., the coin-type half cells were not further charged. Next, the coin-type half cells were each discharged at a C-rate of 0.1 C until the voltage of the cell reached 2.5V. The charge-discharge properties of the coin-type half cells prepared in Example 1 and Comparative Example 1 are shown in Table 1 and FIG. 1.

TABLE 1

| | Charge-Discharge Properties | |
|---|---|---|
| | Charge/Discharge Efficiency (%)* | Discharge Capacity (mAh/g) |
| Example 1 | 95.7 | 166.4 |
| Comparative Example 1 | 92.8 | 167.7 |

*In Table 1, the charge-discharge efficiency (%) is equal to (discharge capacity/charge capacity) * 100.

Referring to Table 1 and FIG. 1, the charge/discharge property of the coin-type half cell that was prepared in Example 1, which does not include any conductive agent, is similar to the charge-discharge property of the coin-type half cell that was prepared in Comparative Example 1, which does include a conductive agent. In detail, the coin-type half cell prepared in Example 1 has a similar discharge capacity to that of the coin-type half cell prepared in Comparative Example 1. Further, the coin-type half cell prepared in Example 1 has excellent charge/discharge efficiency as compared to Comparative Example 1. Thus, the coin-type half cell prepared in Example 1 has an excellent charge-discharge property as compared to the coin-type half cell prepared in Comparative Example 1.

Figure 2:
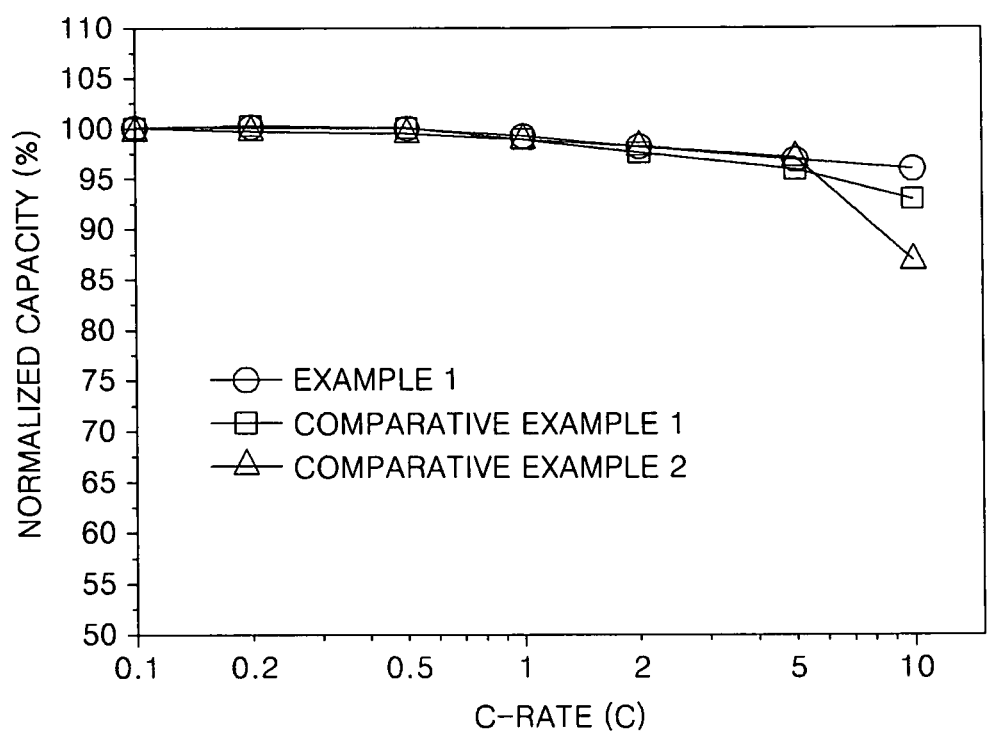
FIG. 2 illustrates a graph of high rate discharge properties of coin-type half cells prepared in Example 1 and Comparative Examples 1 and 2, respectively.

Evaluation 2: Evaluation of High Rate Discharge Property of the Coin-Type Half Cells The coin-type half cells prepared in Example 1 and Comparative Examples 1 and 2 were each charged with a rate (C-rate) of 0.1 C and a constant voltage (1.0V, and 0.01 C cut-off). Then, 10 minutes of rest was maintained for the coin-type half cells. Next, the coin-type half cells were each discharged with a constant current (0.1 C, 0.2 C, 0.5 C, 1 C, 2 C, 5 C, or 10 C) until the voltage of the cell reached 2.5 V. That is, the high rate discharge properties of each of the coin-type half cells were evaluated as a discharge rate, i.e., C-rate, that was changed to 0.1 C, 0.2 C, 0.5 C, 1 C, 2 C, 5 C, or 10 C. The high rate discharge properties are shown in FIG. 2. In FIG. 2, the "C-rate" is a discharge rate of a cell, and is obtained by dividing a total capacity of the cell by a total discharge period of time. In FIG. 2, the "normalized capacity" was calculated according to Equation 1 below. The "normalized capacity" may also be referred to as "capacity retention."

Normalized Capacity(%)=[(Discharge capacity when a cell is discharged at a predetermined rate(C-rate))/(Discharge capacity when a cell is discharged at a rate of 0.1C)]*100     Equation 1

Referring to FIG. 2, the coin-type half cell prepared in Example 1 has an excellent high rate discharge property compared to the coin-type half cells prepared in Comparative Examples 1 and 2. In this case, the high rate discharge property is "excellent" means that a decreasing rate of a normalized capacity, i.e., capacity retention, according to an increase in a discharge rate, i.e., C-rate, is small. In this regard, as shown in FIG. 2, Comparative Examples 1 and 2 have large decreases of normalized capacity as the discharge rate is increased.

Evaluation 3: Evaluation of Lifetime Property of the Coin-Type Half Cells

The coin-type half cells prepared in Example 1 and Comparative Example 1 were each charged with a constant current of 1 C and a constant voltage (1.0V, and 0.01 C cut-off). Then, after 10 minutes of rest was maintained, the coin-type half cells were discharged with a constant current (1 C, and 2.5V cut-off). The above was performed 100 times. That is, the lifetime property of each of the coin-type half cells was evaluated as a change in a normalized capacity according to the number of charge-discharge cycles. The lifetime properties are shown in FIG. 3.

Figure 3:
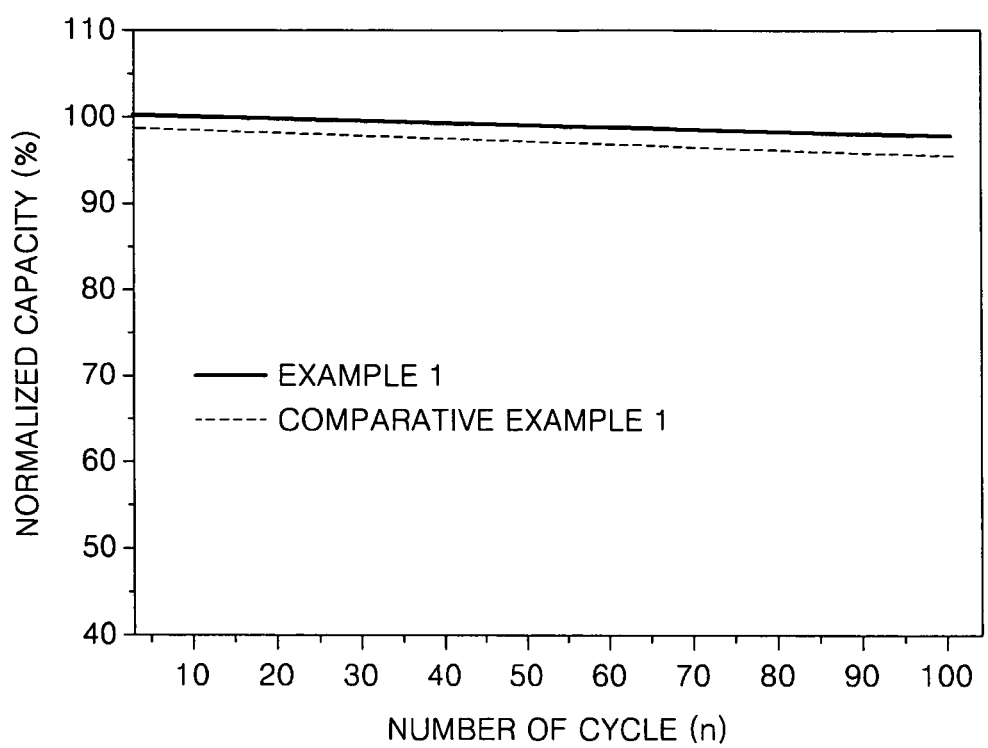
FIG. 3 illustrates a graph of lifetime properties of coin-type half cells prepared in Example 1 and Comparative Example 1, respectively.

Referring to FIG. 3, the coin-type half cell prepared in Example 1 has excellent lifetime properties compared to the coin-type half cell prepared in Comparative Example 1. In this case, that the lifetime property is "excellent" means that a decrease of normalized capacity (that is, capacity retention) according to a number of charge-discharge cycles is small. In this regard, as shown in FIG. 3, Comparative Example 1 had a large decrease in normalized capacity according to a number of charge-discharge cycles.

Evaluation 4: Method of Analyzing Anode

Figure 4:
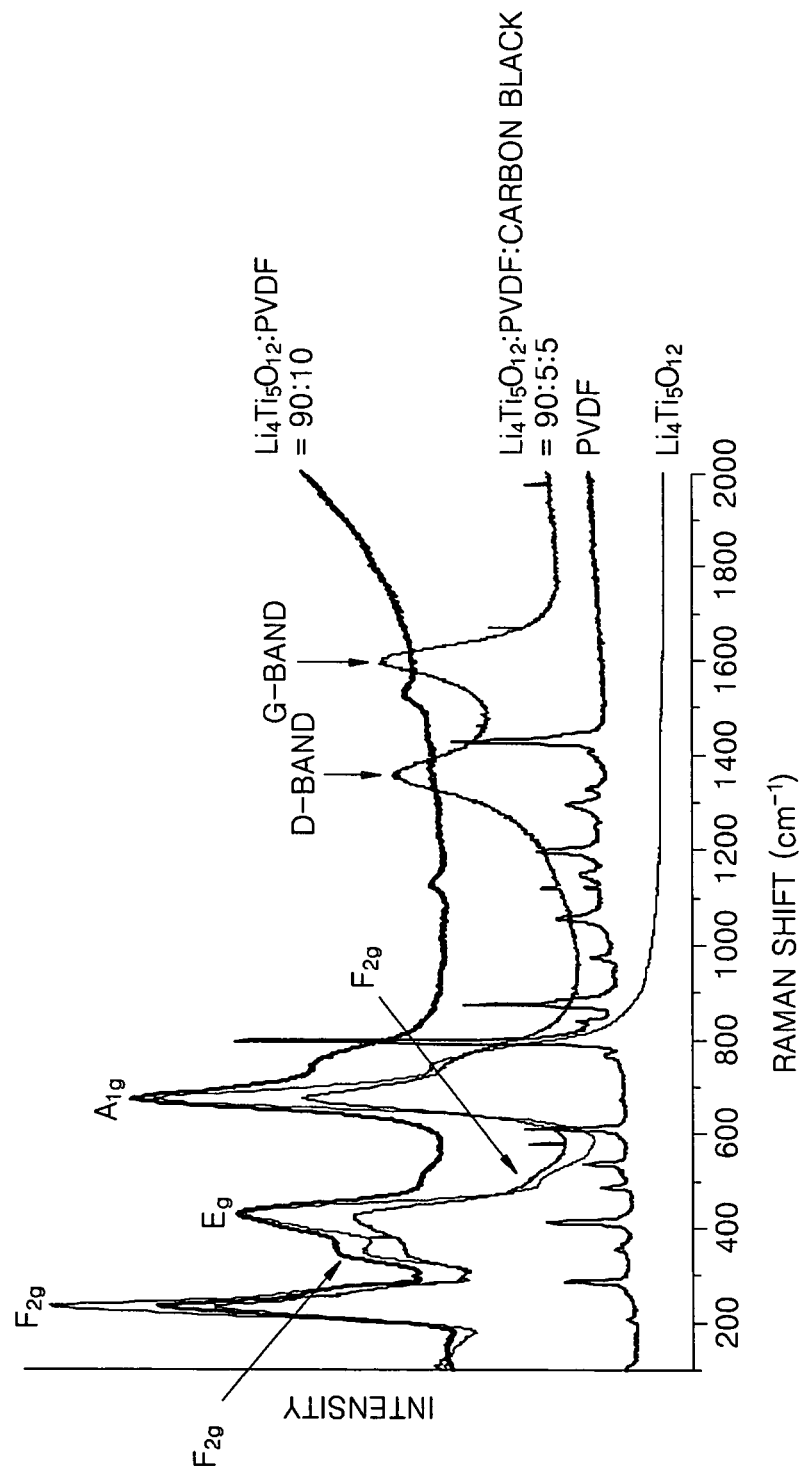
FIG. 4 shows Raman spectra of four anode materials each selected from the group consisting of a binder, lithium titanate, and a carbon-based conductive agent.

In order to analyze the anode prepared in Examples 1 through 3, Raman spectra diagrams were generated. FIG. 4 includes results of the measurement of the Raman spectra for the following: (1) a binder (PVDF), (2) lithium titanate ($Li_4Ti_5O_{12}$), (3) an anode material including 90 parts by weight of lithium titanate ($Li_4Ti_5O_{12}$) and 10 parts by weight of a binder (PVDF), and (4) an anode material including 90 parts by weight of lithium titanate ($Li_4Ti_5O_{12}$), 5 parts by weight of carbon black sold under the trademark SUPER P®, and 5 parts by weight of a binder. The above were measured using a Raman spectrometer (using a Raman spectrometer sold under the trademark Nanofinder® 30 by TOKYO INSTRUMENT INC).

Referring to FIG. 4, lithium titanate ($Li_4Ti_5O_{12}$) has peaks of F2g oscillation modes at Raman shifts of 200 to 300 $cm^{-1}$, 300 to 400 $cm^{-1}$ and 460 to 550 $cm^{-1}$, a peak of a Eg oscillation mode at a Raman shift of 400 to 460 $cm^{-1}$, and a peak of a A1g oscillation mode at a Raman shift of 600 to 700 $cm^{-1}$. In addition, the carbon black sold under the trademark SUPER P® has a peak of a D band at a Raman shift of 1200 to 1500 $cm^{-1}$, and a peak of a G band at a Raman shift of 1500 to 1700 $cm^{-1}$. While some peaks of the binder (PVDF) overlap some peaks of lithium titanate ($Li_4Ti_5O_{12}$) and the carbon-based conductive agent (Super P), the binder (PVDF) does not have the peak of a F2g oscillation mode having a spinel structure at a Raman shift of 200 to 300 $cm^{-1}$, the peak of the D band at a Raman shift 1300 to 1400 $cm^{-1}$, and the peak of the G band at a Raman shift of 1500 to 1700 $cm^{-1}$. Thus, the anode may be analyzed by evaluating a ratio [(I(D)+I(G))/I(F2g)] of the sum of a peak intensity "I(D)" of a D band at a Raman shift of 1300 to 1400 $cm^{-1}$ and a peak intensity "I(G)" of a G band at a Raman shift 1500 to 1700 $cm^{-1}$ to a peak intensity "I(F2g)" of a F2g oscillation mode having a spinel structure at a Raman shift of 200 to 300 $cm^{-1}$.

Evaluation 5: Analysis of Anode

Figure 5:
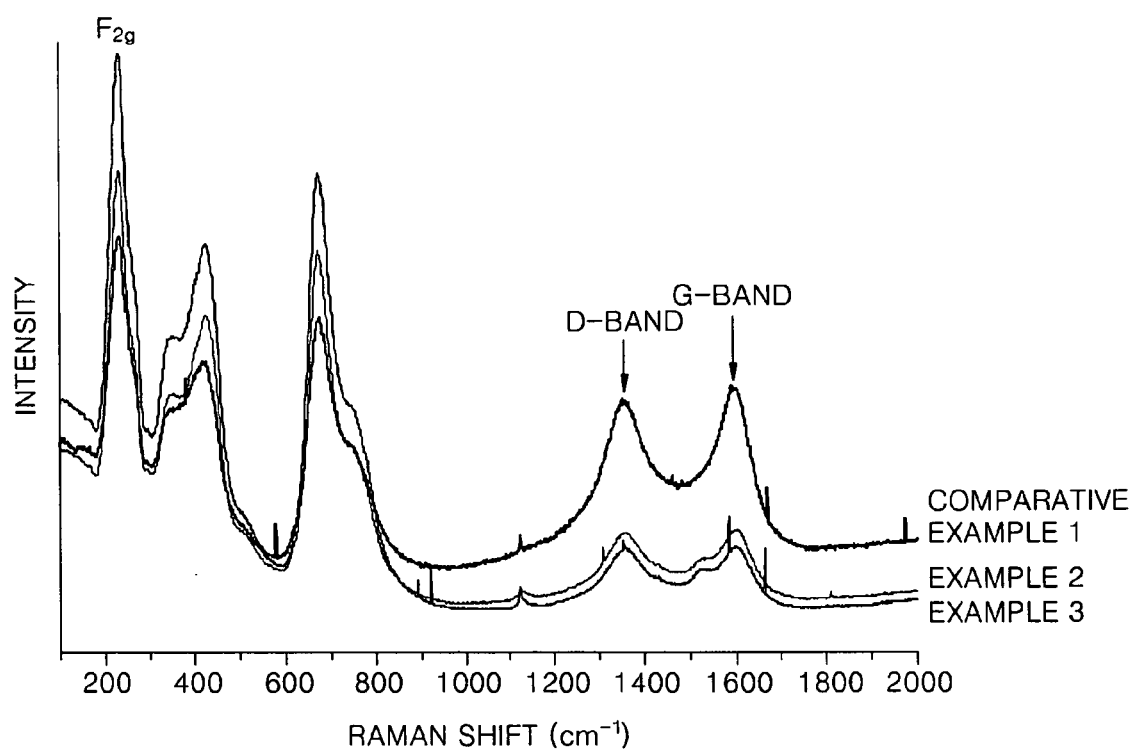
FIG. 5 shows Raman spectra of anodes prepared in Examples 2 and 3, and Comparative Example 1, respectively.

Raman spectra of the anodes prepared in Examples 1 through 3, and Comparative Example 1 were measured in the same manner as in Evaluation 4. The measurement results of Examples 2 and 3 and Comparative Example 1 are shown in FIG. 5. In addition, after the measurement, base line correction and smoothing were performed. Then, the Raman spectra of each of the anodes were analyzed in the same manner as in Evaluation 4. Results of the analysis are shown in Table 2.

TABLE 2

| | Peak Intensity (counts per second) | | | |
|---|---|---|---|---|
| | I(F2g) | I(D) | I(G) | (I(D) + I(G))/I(F2g) |
| Example 1 | 75180.0 | 0 | 0 | 0 |
| Example 2 | 90828.0 | 19147.0 | 20472.4 | 0.44 |
| Example 3 | 114072.5 | 16638.2 | 17679.6 | 0.30 |
| Comparative Example 1 | 67225.0 | 42393.2 | 47769.1 | 1.34 |

Referring to Table 2 and FIG. 5, in the cases of Examples 1 through 3 where an amount of a carbon-based conductive agent is equal to or less than about 1.12 parts by weight based on 100 parts by weight of lithium titanate, a relative peak intensity [I(D)+I(G))/I(F2g)] is 0.44 or less, which is very low. However, as the amount of the carbon-based conductive agent is increased, as in Comparative Example 1, the relative peak intensity [I(D)+I(G))/I(F2g)] is much higher at 1.34.

Figure 6:
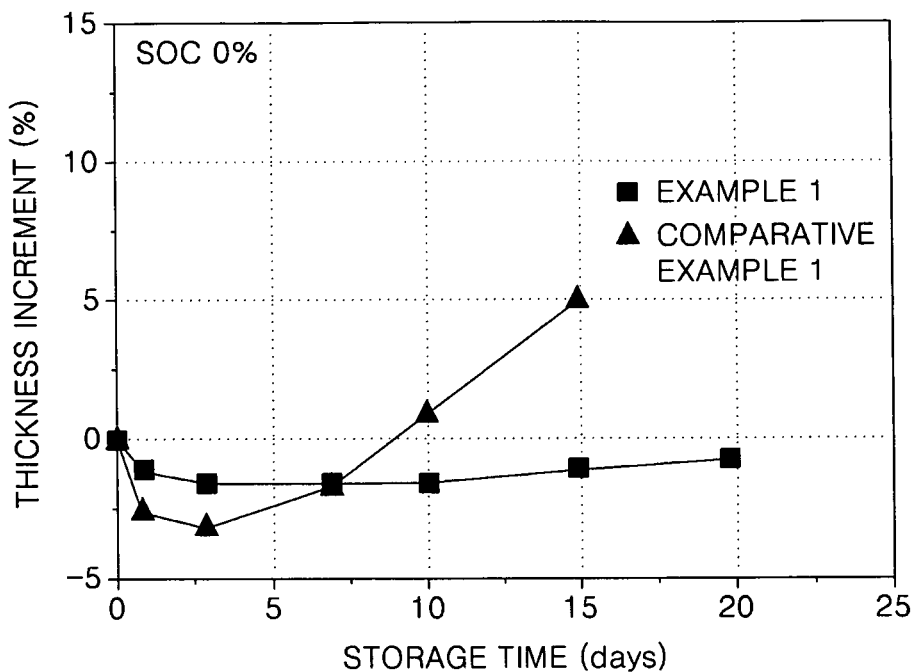
FIG. 6 illustrates a graph of a change in a cell thickness when 10 Ah pouch-type full cells (a status of charging (SOC) of the cell is 0%) prepared in Example 1 and Comparative Example 1 are stored at a high temperature.

Evaluation 6: First Evaluation of Cell Expansion Effect when the Pouch-Type Full Cells are Stored at a High Temperature The pouch-type full cells prepared in Example 1 and Comparative Example 1 were each discharged with a constant current (1 C, and 1.5V cut-off) until a state of charging (SOC) reached 0%, and were stored for 0 to 20 days at a relatively high temperature of 60° C. That is, the cell expansion effect the pouch-type full cells was evaluated as a change in the thickness of each of the pouch-type full cells according to the storage time after the cell was stored at a high temperature. The cell expansion effect is shown in FIG. 6. In FIG. 6, the "thickness increment" is a ratio of a cell thickness after the cell is stored for a predetermined period of time at a high temperature to a cell thickness before the cell was stored at the high temperature. In addition, the term "cell thickness" refers to an outermost thickness of a cell, which may be invisible to the naked eye.

Referring to FIG. 6, when stored for 10 days or more at a high temperature, the pouch-type full cell that was prepared in Example 1 has a lower cell expansion effect than the pouch-type full cell prepared in Comparative Example 1.

Evaluation 7: Second Evaluation of Cell Expansion Effect when the Pouch-Type Full Cells are Stored at a High Temperature The pouch-type full cells each prepared in Example 1 and Comparative Example 1 were each charged with a constant current of 1 C and a constant voltage (2.8V, and 0.05 C cut-off) until a state of charging (SOC) reached 100%, and were stored for 0 to 20 days at a relatively high temperature of 60° C. That is, the cell expansion effect of each of the pouch-type full cells was evaluated as a change in the thickness of each of the pouch-type full cells according to the storage time after the cell was stored at a high temperature. The cell expansion effect is shown in FIG. 7.

Figure 7:
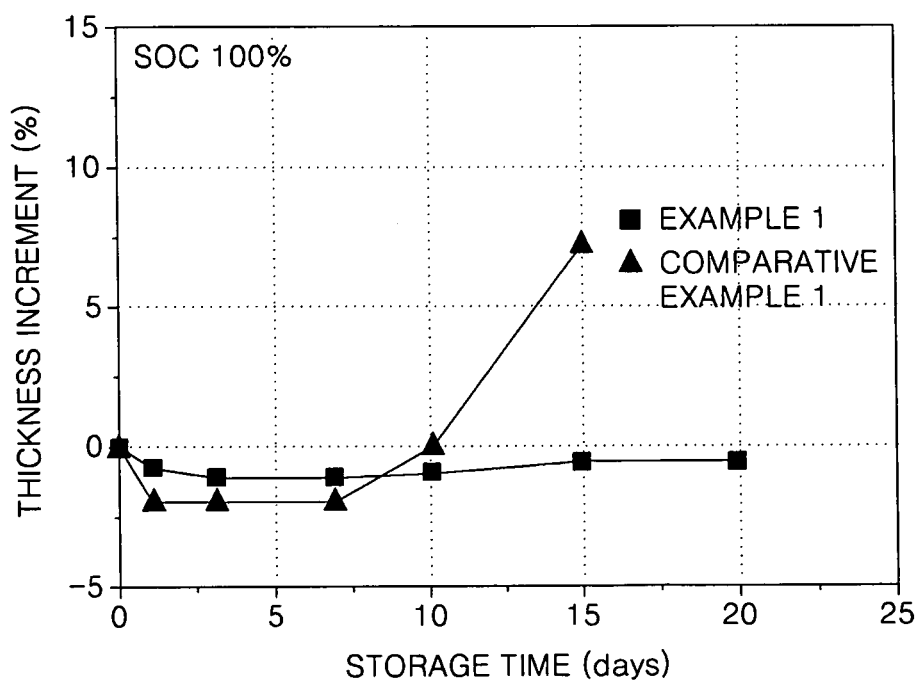
FIG. 7 illustrates a graph of a change in a cell thickness when 10 Ah pouch-type full cells (a SOC of the cell is 100%) prepared in Example 1 and Comparative Example 1 are stored at a high temperature.

Referring to FIG. 7, when stored for 10 days or more at a high temperature, the pouch-type full cell that was prepared in Example 1 has a lower cell expansion effect than the pouch-type full cell prepared in Comparative Example 1.

Figure 8:
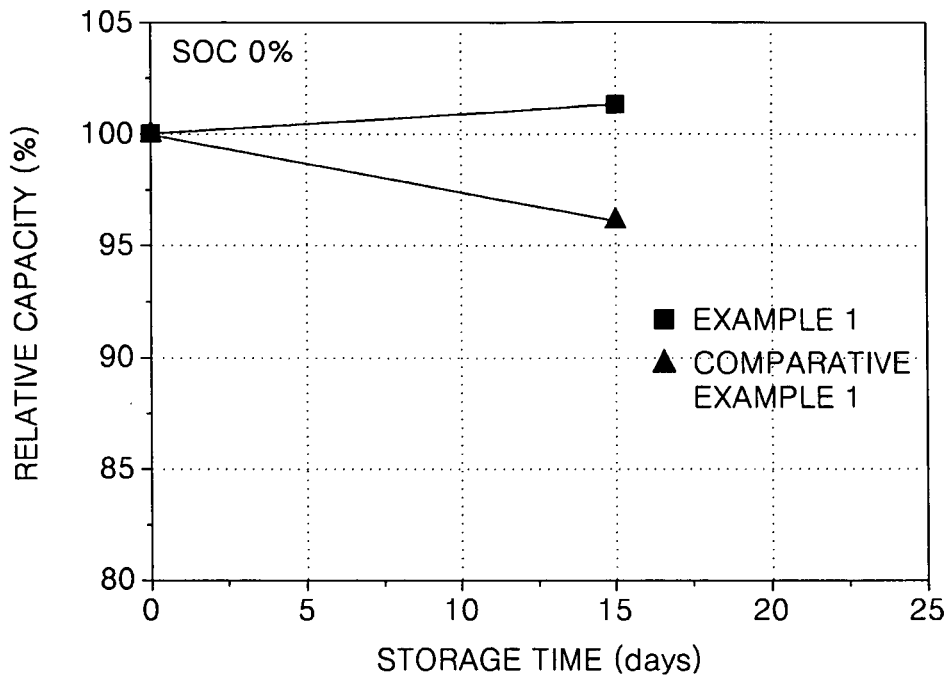
FIG. 8 illustrates a graph of a relative capacity of a cell when 10 Ah pouch-type full cells (a SOC of the cell is 0%) prepared in Example 1 and Comparative Example 1 are stored at a high temperature.

Evaluation 8: First Evaluation of Cell Capacity Retention when the Pouch-Type Full Cells are Stored at a High Temperature The pouch-type full cells prepared in Example 1 and Comparative Example 1 were each discharged with a constant current (1 C, and 1.5V cut-off) until a state of charging (SOC) reached 0%, and then were stored for about 15 days. That is, the cell capacity retention of each of the pouch-type full cells was evaluated as a relative capacity of the cell after the cell was stored at a high temperature. The cell capacity retention is shown in FIG. 8. In this case, the term "relative capacity of cell" refers to a ratio of a capacity of a cell after the cell is stored a high temperature to a capacity of the cell before the cell is stored at the high temperature.

Referring to FIG. 8, when stored for 15 days at a high temperature, the pouch-type full cell that was prepared in Example 1 has higher cell capacity retention than the pouch-type full cell prepared in Comparative Example 1.

Evaluation 9: Second Evaluation of Cell Capacity Retention when the Pouch-Type Full Cells are Stored at a High Temperature The pouch-type full cells each prepared in Example 1 and Comparative Example 1 were each charged with a constant current of 1 C and a constant voltage (2.8V, and 0.05 C cut-off) until a state of charging (SOC) reached 100%, and then were stored for about 15 days at a relatively high temperature of 60° C. That is, the cell capacity retention of each of the pouch-type full cells was evaluated as a relative capacity of the cell after the cell was stored at a high temperature. The cell capacity retention is shown in FIG. 9.

Figure 9:
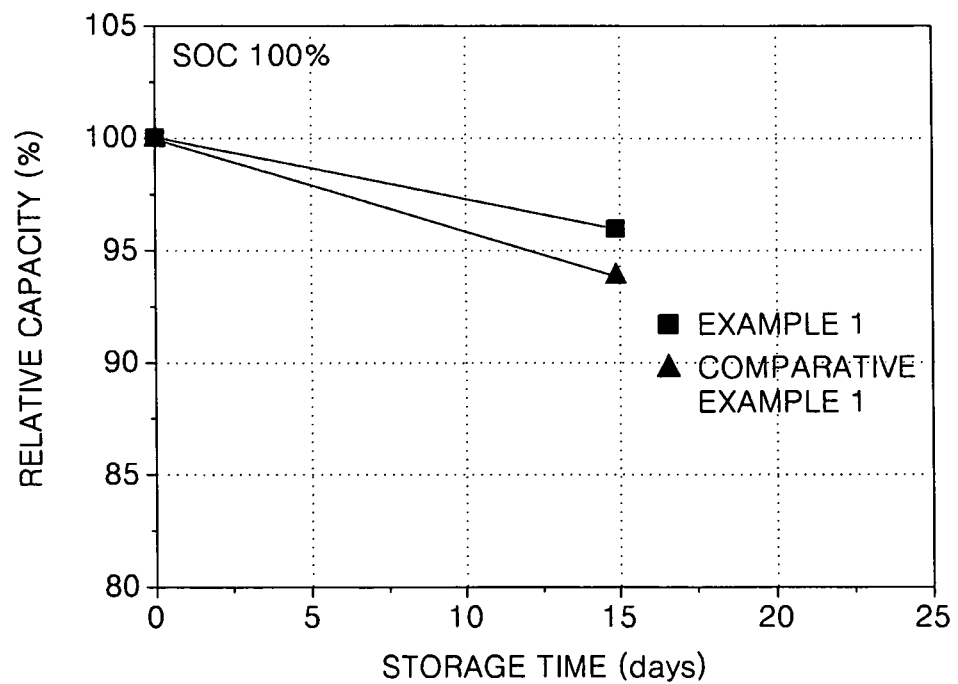
FIG. 9 illustrates a graph of a relative capacity of a cell when 10 Ah pouch-type full cells (a SOC of the cell is 100%) prepared in Example 1 and Comparative Example 1 are stored at a high temperature.

Referring to FIG. 9, when stored for 15 days at a high temperature, the pouch-type full cell that was prepared in Example 1 has higher cell capacity retention than the pouch-type full cell prepared in Comparative Example 1.

Evaluation 10: Evaluation of High Rate Discharge Property of the Pouch-Type Full Cells The pouch-type full cells prepared in Example 1 and Comparative Example 1 were each charged with a constant current of 0 to 20 C and a constant voltage (2.8V, and 0.05 C cut-off). Then, after 10 minutes of rest was maintained, the pouch-type full cells were each discharged until the voltage of the cell reached 1.5 V under the same constant current conditions as those of the above charging process. That is, the high rate discharge property of each of the pouch-type full cells was evaluated by changing a discharging rate (C-rate) from 0 C to 20 C. The high rate discharge property is shown in FIG. 10.

Figure 10:
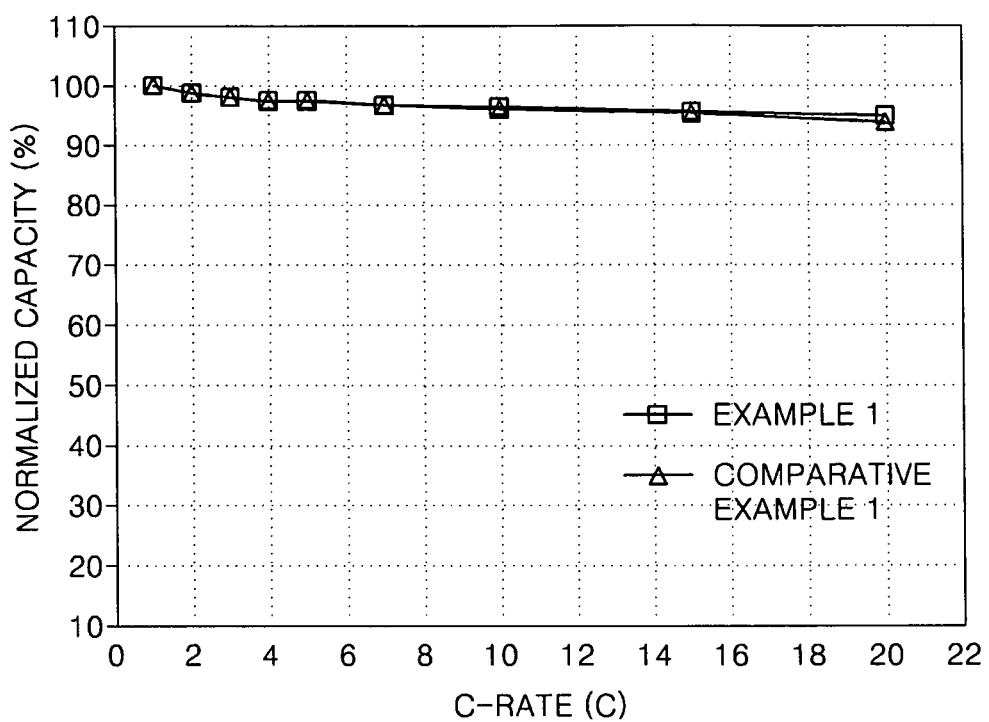
FIG. 10 illustrates a graph of high rate discharge properties of 10 Ah pouch-type full cells prepared in Example 1 and Comparative Example 1.

Referring to FIG. 10, the pouch-type full cell prepared in Example 1 has an excellent high rate discharge property compared to the pouch-type full cell prepared in Comparative Example 1.

Evaluation 11: Evaluation of Lifetime Property of the Pouch-Type Full Cells

The pouch-type full cells prepared in Example 1 and Comparative Example 1 were each charged with a constant current of 4 C and a constant voltage (2.8V, and 0.05 C cut-off). Then, after 10 minutes of rest was maintained, and the pouch-type full cells were discharged with a constant current (4 C, and 1.5V cut-off). The discharging and charging processes which were performed 500 times. That is, the lifetime property of each of the pouch-type full cells was evaluated as a change in a normalized capacity according to the number of charge-discharge cycles. The lifetime property is shown in FIG. 11.

Figure 11:
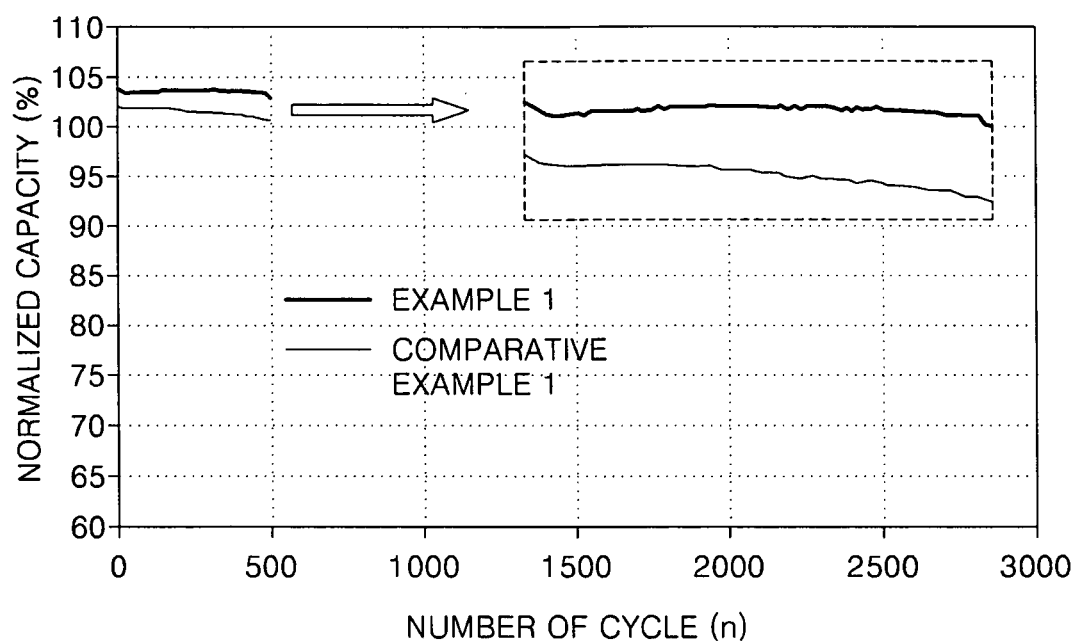
FIG. 11 illustrates a graph of lifetime properties of 10 Ah pouch-type full cells prepared in Example 1 and Comparative Example 1.

Referring to FIG. 11, the pouch-type full cell prepared in Example 1 has an excellent lifetime property compared to the pouch-type full cell prepared in Comparative Example 1.

According to exemplary embodiments, an anode may include an anode active material including a lithium titanium oxide, a binder, and 0 to 2 parts by weight of a carbon-based conductive agent based on 100 parts by weight of the lithium titanium oxide. The anode may not generate gas during charging and discharging at a high temperature when the anode is used in a lithium battery When the lithium battery includes the anode, the cell expansion effect may be reduced during charging and discharging at a high temperature, thereby improving and/or ensuring high-temperature reliability and increased lifetime. A typical graphite anode may not have these same characteristics.

By way of summation and review, research has been conducted in order to use a high-capacity silicon (Si)-based transition metal oxide and tin (Ti)-based transition metal oxide as well as graphite as an anode active material. Recently, a lithium titanium oxide (e.g., $Li_4Ti_5O_{12}$) having a spinel structure has received considerable attention due to its high thermal stability, high reversibility, and high efficiency.

When a cell is prepared by using an anode including a lithium titanium oxide as an anode active material and using a cathode including a lithium cobalt oxide, and the cell is left at a high temperature of about 60° C., the long-term reliability and lifetime of the high-capacity cell may be reduced. For example, the thickness of the cell may be remarkably increased, thereby reducing the capacity and lifetime of the cell. The effect, which is referred to as cell expansion effect, of the thickness of the cell being remarkably increased after the cell is left at a high temperature is likely to occur in a case of a high-capacity cell such as a cell for storing a large amount of power or a cell used in an electrical vehicle.

Embodiments, e.g., the exemplary embodiments discussed above, relate to anodes comprising an anode active material including a lithium titanium oxide, a binder, and 0 to 2 parts by weight of a carbon-based conductive agent based on 100 parts by weight of the lithium titanium oxide.

Provided are lithium batteries including the anode.

Additional aspects, in part, were set forth in the above description and, in part, will be apparent from the description, or may be learned by practice of the presented embodiments.

Exemplary embodiments have been disclosed herein, and although specific terms are employed, they are used and are to be interpreted in a generic and descriptive sense only and not for purpose of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope of the present invention as set forth in the following claims.

What is claimed is:

1. An anode, comprising:
an anode active material including a lithium titanium oxide;
a binder; and
greater than 0 parts by weight to 1 parts by weight of a carbon-based conductive agent based on 100 parts by weight of the lithium titanium oxide, wherein the carbon-based conductive agent includes carbon black,
wherein the lithium titanium oxide is represented by Formula 1 below:

$$Li_{4+x}Ti_{5-y}M_zO_{12-n},\qquad \text{<Formula 1>}$$

where $-0.2 \leq x \leq 0.2$, $-0.3 \leq y \leq 0.3$, $0 \leq z \leq 0.3$, $-0.3 \leq n < 0.3$, and M comprises at least one of lithium (Li), magnesium (Mg), aluminium (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

2. The anode of claim 1, wherein the carbon-based conductive agent further comprises at least one of carbon fiber or graphite.

3. The anode of claim 1, further comprising other conductive agents, the other conductive agents being different from the carbon-based conductive agent and including at least one of a metallic fiber, a non-metallic powder, a metallic powder, a conductive whisker, a conductive metal oxide, and a polyphenylene derivative.

4. The anode of claim 1, wherein a ratio $[(I(D)+I(G))/I(F2g)]$ is 0 to about 0.44, where $I(D)$ is a peak intensity of a D band on a Raman spectra of the anode at a Raman shift of 1300 to 1400 $cm^{-1}$, $I(G)$ is a peak intensity of a G band on the Raman spectra of the anode at a Raman shift 1500 to 1700 $cm^{-1}$, and $I(F2g)$ is a peak intensity of a F2g oscillation mode having a spinel structure on the Raman spectra at a Raman shift of 200 to 300 $cm^{-1}$.

5. A lithium battery comprising an anode of claim 1.

6. The lithium battery of claim 5, wherein the lithium battery is a secondary battery.

7. The anode of claim 1, wherein an amount of the carbon-based conductive agent is greater than 0 parts by weight to 0.5 parts by weight, based on 100 parts by weight of the lithium titanium oxide.

* * * * *